United States Patent [19]

Rosensweig

[11] 4,149,620

[45] Apr. 17, 1979

[54] WORK TRANSFER APPARATUS

[75] Inventor: Nathan Rosensweig, Winsted, Conn.

[73] Assignee: Edward Segal, Inc., Thomaston, Conn.

[21] Appl. No.: 645,518

[22] Filed: Dec. 31, 1975

[51] Int. Cl.² ............................................. B65G 17/34
[52] U.S. Cl. ................................................ 198/345
[58] Field of Search ................. 198/19, 110, 181, 195, 198/345, 793

[56] References Cited

U.S. PATENT DOCUMENTS

| | | | |
|---|---|---|---|
| 2,990,940 | 7/1961 | Merchant | 198/181 |
| 3,308,921 | 3/1967 | Bower | 198/345 |
| 3,323,630 | 6/1967 | Fowler et al. | 198/19 |
| 3,858,707 | 1/1975 | Block et al. | 198/19 |
| 3,926,489 | 12/1975 | Futch | 198/181 |

*Primary Examiner*—Joseph E. Valenza
*Attorney, Agent, or Firm*—Paul J. Cook

[57] ABSTRACT

A work indexing apparatus is provided having a plurality of platens mounted on an endless conveyor adapted to be moved to a plurality of work stations in an indexing mode. The platens are positioned precisely by means of pins having a tapered surface rigidly attached to the platens and sockets adapted to receive the platens. The sockets are movable in an arcuate path to receive the pins and are linked to a common actuating means.

6 Claims, 4 Drawing Figures

WORK TRANSFER APPARATUS

BACKGROUND OF THE INVENTION

This invention relates to an apparatus for delivering work pieces to successive work stations and more particularly to a positioning apparatus provided with means for positively and precisely locating work pieces throughout successive manufacturing steps.

Automated manufacturing systems having successive synchronized work operations are well known in the art. Typically, a transfer apparatus is provided wherein a plurality of pallets or platens are secured to a common conveyor such as a chain so that they are precisely located on the conveyor relative to each other. With such an apparatus, the platens are driven by the conveyor, generally in an indexing mode, to a plurality of successive work stations wherein work pieces on the platens are manually or automatically processed at the work station. When the work pieces are processed automatically, it is essential that the platen supporting the work piece be precisely located relative to the work station so that the desired processing of the work piece can be completed. A common means for attaining the desired precision is to accurately assemble the platens on a chain by rigidly fixing the platens to the chain at precise locations so that when the chain is indexed during use, the platen and the work piece thereon will be precisely located at the work station. This solution has proven to be less than satisfactory since the accuracy demanded during manufacture renders manufacture of such a construction time consuming and expensive. In addition, during use of such a construction, the chain gradually becomes worn and/or stretched over a relatively short period of time thereby causing the platens to become misaligned relative to the work stations. This requires that the chain-platen portion of such an apparatus be replaced within a relatively short time. Alternatively, it has been proposed to attain precise positioning of the platens by an arrangement which includes contact bushings in the platen and stop-pins which are arranged to mate with the bushing. The stop-pins are adapted to move in a vertical path to enter and exit the bushings thereby effecting desired positioning of the platens. This arrangement requires individual actuating means for each set of stop-pins associated with individual platens, since the stop-pins require an essentially vertical path. Thus, this arrangement is undesirably expensive due to the required individual controls and individual means for moving the stop-pins into registry.

Thus, it would be desirable to provide a means for accurately positioning platens adapted to support a work piece which does not require accurate positioning of the platen on a conveyor or chain during manufacture. Furthermore, it would be desirable to provide a positioning means having common controls and actuating means for all such positioning means associated with the individual platens.

SUMMARY OF THE INVENTION

This invention provides a work indexing apparatus useful for automatically performing work on articles at each of several stations. The work indexing apparatus includes a table, an endless conveyor means which has attached thereto a plurality of platens. The platens are in slideable contact with the table and are moved by the conveyor incrementally along the endless path. Each of the platens are provided with at least two pins having a tapered surface which are rigidly attached to the platens. After each incremental movement of the platen, the platens are accurately and precisely positioned at each work station by moving the sockets in an arcuate path to register with the pins.

This apparatus provides substantial advantages over the apparatus of the prior art in that it eliminates the need for precise and accurate manufacture of the conveyor-platens assemblies. Thus, the platens need not be rigidly mounted on the conveyor but can be mounted so that they are free-floating and can be positioned under the influence of the registry between the pins and the sockets. Therefore, any change in conveyor length caused by conveyor wear during use is compensated for by the positioning means of this invention. Furthermore, since registry between the pins and the sockets can be accomplished by moving the sockets in an arcuate path, a plurality of socket means can be mounted on a common shaft so that a plurality of sockets share a common control means and common actuating means. This materially reduces the cost of the work indexing apparatus without sacrifice of accuracy in positioning.

DESCRIPTION OF THE DRAWINGS

FIG. 4 is a schematic view of the apparatus of this invention.

DESCRIPTION OF SPECIFIC EMBODIMENTS

Figure 1:
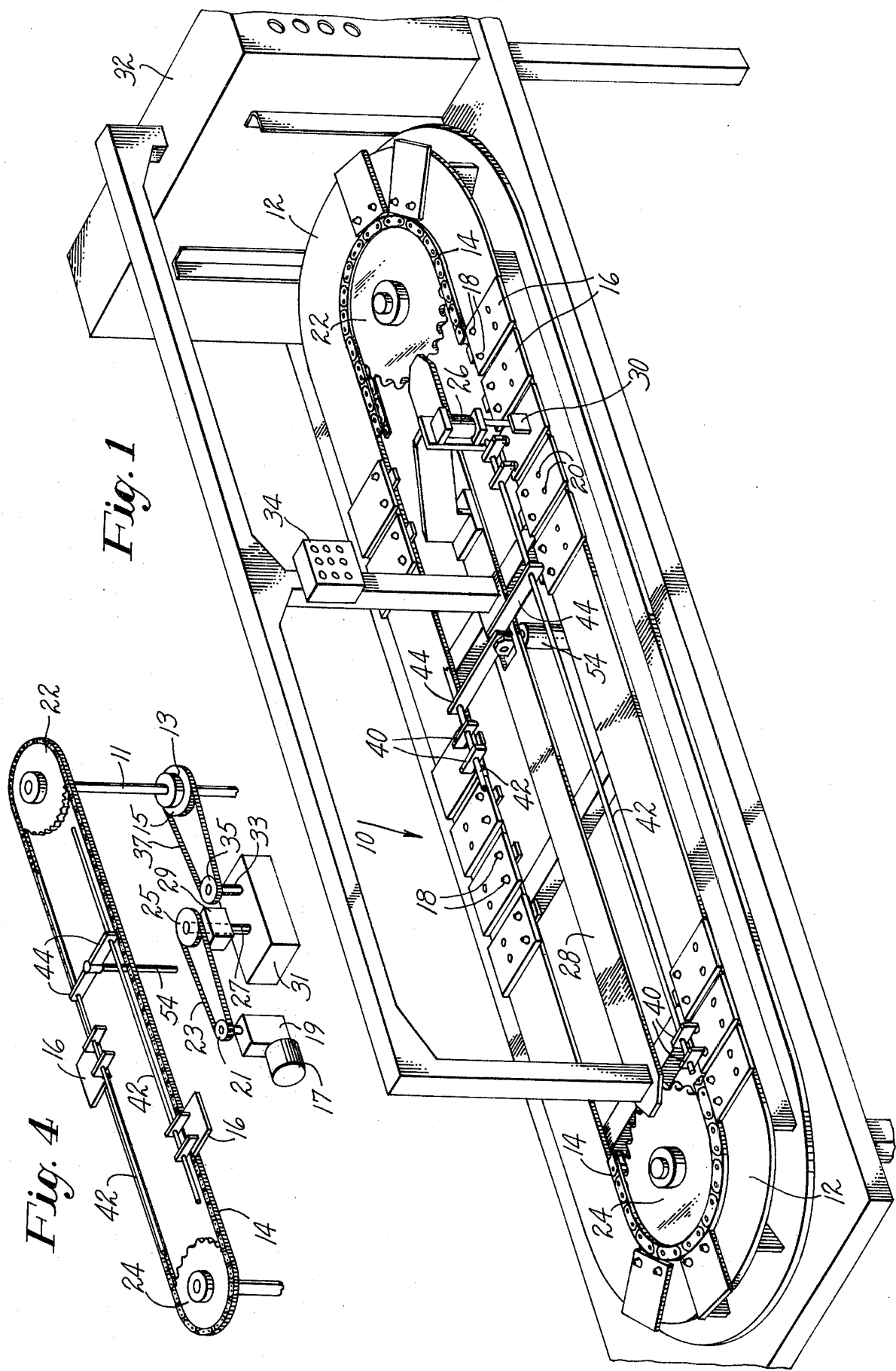
FIG. 1 is a perspective view of the work indexing apparatus of this invention.

The work indexing apparatus 10 includes a table 12, a chain conveyor 14 and a plurality of platens 16 attached to the conveyor 14. The top surface of the table 12 in contact with the platens 16 can be coated with a friction reducing material such as Nylon or Teflon. Each platen 16 is provided with at least two tapered pins 18 and can be provided with holes 20 to facilitate positioning a work piece on the platen 16. The chain 14 is moved in an endless path by means of a drive sprocket 22 and an idler sprocket 24. The drive sprocket 22 is rotated in an indexing mode so that the platen 16 moves incrementally on the endless path to one or a plurality of work stations 26 mounted on center plate 28 or on stands mounted outboard of frame 28 so that the desired operation on work piece 30 can be accomplished. The indexing table 10 is provided with a control panel 32 which is adapted to effect automatic or manual operation of the work indexing apparatus. Control panel 34 is adapted to effect manual or automatic operation of work station 26 independently or in conjunction with control panel 32. A plurality of pairs of socket registry arms 40 are mounted on rotatable shafts 42 which can be in turn rotated by means of levers 44. Each registry arm 40 is provided with a socket of a size such that it registers with an intermediate portion of the tapered surface of the pins 18.

Figure 2:
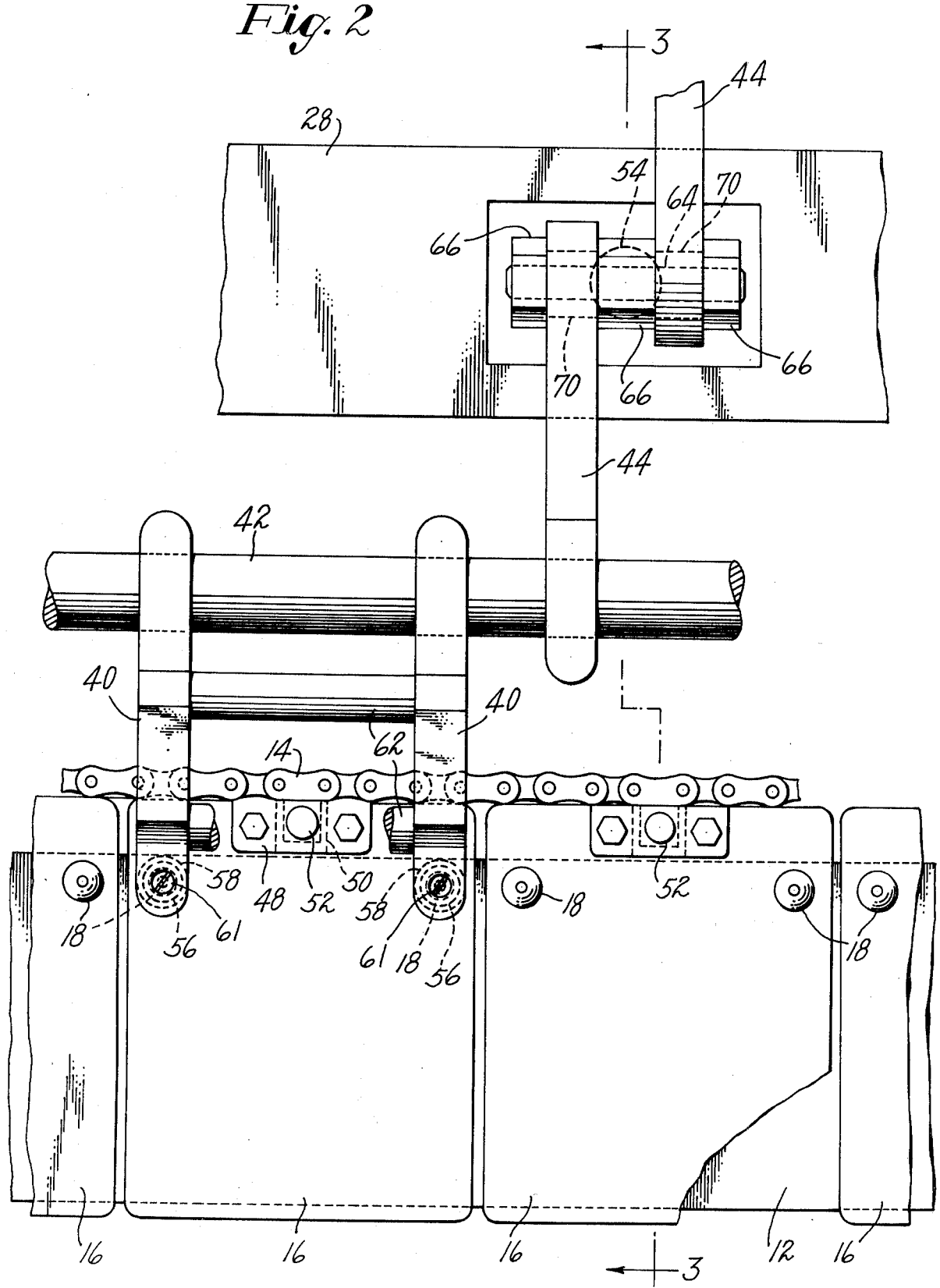
FIG. 2 is a top view of the positioning means of this invention.
Figure 3:
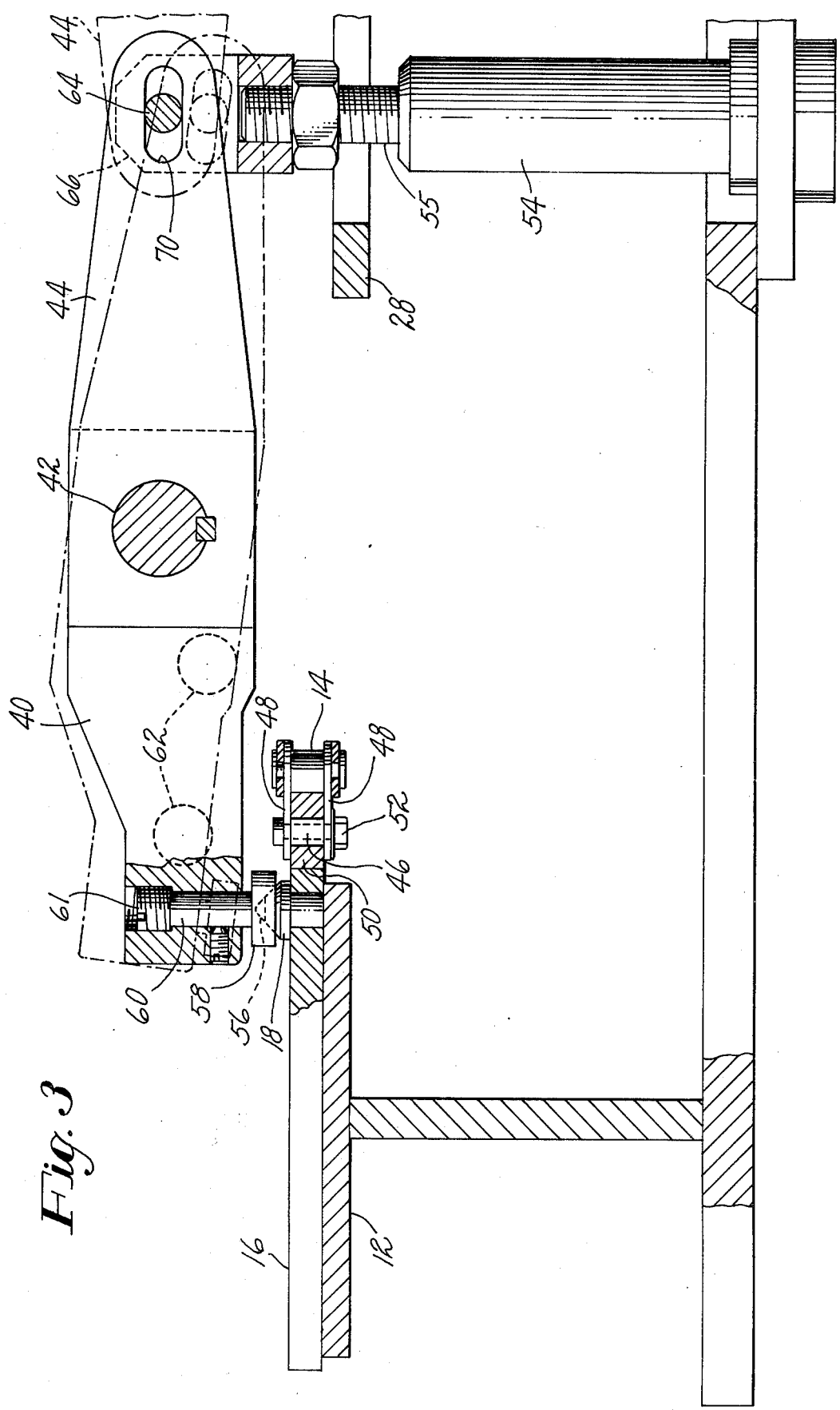
FIG. 3 is a side view of the apparatus of FIG. 2.

The positioning means of the present invention is shown in detail in FIGS. 2 and 3. Platen 16 is attached to chain 14 by means of bolt 46 through links 48 of chain 14 and bushing 50 of platen 16 and secured by means of nut 52. Tapered pins 18 register with socket 56 which is bored in registry cup 58 attached to shaft 60. Shaft 60 is adjustable within and secured in registry arm 40 by means of set screw 62. The registry arms 40 are rigidly secured to and spaced by spacer shafts 62 and are mounted on rotatable shaft 42. The spacer shafts 62 position the registry arms 40 so that the sockets 56 receive the pins 18 when it is desired to properly position platen 16. Levers 44 are mounted on shaft 42 and shaft 64. The lever arms 44 are secured to bracket 66 by means of shaft 64. Bracket 66 is mounted on shaft 64 and plunger 55 which in turn is adapted to move vertically within a pneumatic cylinder 54.

In operation, the pneumatic cylinder 54 is manually or automatically actuated in response to the control means 32 when platen 16 is stopped below the registry arms 40 so that pins 18 are in registerable position with sockets 56. The plunger 55 moves vertically upward as does shaft 64. During this movement, shaft 64 slides in slot 70 to cause lever to move arcuately in a counter-clockwise direction. This movement, in turn, causes shaft 42 and registry arm 40 also to move in a counter-clockwise direction and causes the socket 56 to move arcuately in a counter-clockwise direction to receive tapered pins 18. When the tapered pins are received by sockets 56, the platen 16 is accurately and rigidly positioned to permit work to be done automatically on a work piece on the platen 16.

Referring to FIG. 4, conveyor drive sprocket 22 is mounted to shaft 11 which has mounted thereon an overload clutch coupling 13 and a drive shaft sprocket 15. The conveyor drive sprocket 22 is actuated by motor 17 coupled to a gear reducer 19. The gear reducer 19 is provided with a reducer sprocket 21 which is connected by chain 23 to clutch sprocket 25. Clutch sprocket 25 is mounted on shaft 27 which also has mounted thereon a single revolution clutch brake 29. Shaft 27 is connected to index drive 31 having an output shaft 33 and an index drive sprocket 35. Chain 37 connects index drive sprocket 35 and drive shaft sprocket 15.

An example of a suitable operation of the apparatus of this invention is as follows: In response to a signal from the control board 32 to begin a cycle, the drive motor 17 is actuated and the shaft 27 makes one revolution in response to the clutch brake 29. This causes the output shaft of the index drive 31 to make one third of a revolution thereby transmitting this movement to the index drive sprocket 35 through chain 37 and drive shaft sprocket 15 to overload clutch 13. In response thereto, conveyor drive sprocket 22 moves the conveyor chain 14 the equivalent the length of one platen 16. Upon completion of the indexing of chain 14, pneumatic cylinder 54 is actuated such as by a solenoid air valve so that the socket 56 moves arcuately to receive tapered pins 18 thereby locking the platen 16 into position. Upon completion of the desired dwell time for the platen 16, a solenoid air valve is actuated to deactivate pneumatic cylinder 54 and cause the socket 56 to move arcuately in a clockwise direction thereby unlocking the platen 16. The cycle then is repeated.

It is to be understood that any conventional means for actuating levers can be employed including electrical means, pneumatic means, or mechanical means. Similarly, it is to be understood that the tapered pin need not be in a shape of a solid cone as shown in the drawings but have any shape so long as they include a tapered surface adapted to be received by sockets of a suitable shape for mating therewith. Furthermore, the path of travel of the conveyor and platens need not be in a substantially horizontal plane as shown in the drawings but can be in a substantially vertical plane if desired.

What is claimed is:

1. A work indexing apparatus including a table, an endless conveyor means adjacent said table, a plurality of spaced platen means attached to said conveyor in slidable contact with said table along at least a portion of the path of travel of said conveyor means, driving means for said conveyor means to move said conveyor means and platen means incrementally along said path, and positioning means for said platen means, said positioning means comprising at least two pins having a tapered surface rigidly attached to a surface of each of said platen means, a plurality of socket means mounted on at least one common rotatable shaft wherein a socket means is associated with each of said pins on at least one of said platen means for moving in an arcuate path to receive said pins on at least two of said platen means in order to precisely position the platens adjacent said socket means.

2. The apparatus of claim 1 wherein the conveyor means is adapted to move in a closed path in a generally horizontal plane.

3. The apparatus of claim 1 wherein the conveyor means is adapted to move in a closed path in a generally vertical plane.

4. The apparatus of claim 1 having two rotatable shafts, each of said shafts having a plurality of socket means mounted thereon.

5. A positioning apparatus for a plurality of spaced platen means adapted to move incrementally in a closed path comprising at least two pins having a tapered surface rigidly attached to a surface of each of said platen means, a plurality of pairs of rigidly spaced arms each having sockets to receive said pins in order to precisely position the platen means, a plurality of pairs of said arms being mounted on at least one common rotatable shaft, and a single actuating means for rotating all of the said common rotatable shafts in order to move said sockets in an arcuate path.

6. The apparatus of claim 5 having two common rotatable shafts each having mounted thereon a plurality of pairs of rigidly spaced arms.

* * * * *